Sept. 16, 1958 J. J. FOGARTY 2,851,982
HYDRAULIC SERVO ACTUATOR UNIT FOR TORPEDO RUDDERS
Filed Jan. 18, 1954 3 Sheets-Sheet 1

INVENTOR.
JOHN J. FOGARTY
ATTORNEYS

Sept. 16, 1958  J. J. FOGARTY  2,851,982
HYDRAULIC SERVO ACTUATOR UNIT FOR TORPEDO RUDDERS
Filed Jan. 18, 1954  3 Sheets-Sheet 2

INVENTOR.
JOHN J. FOGARTY
BY
ATTORNEYS

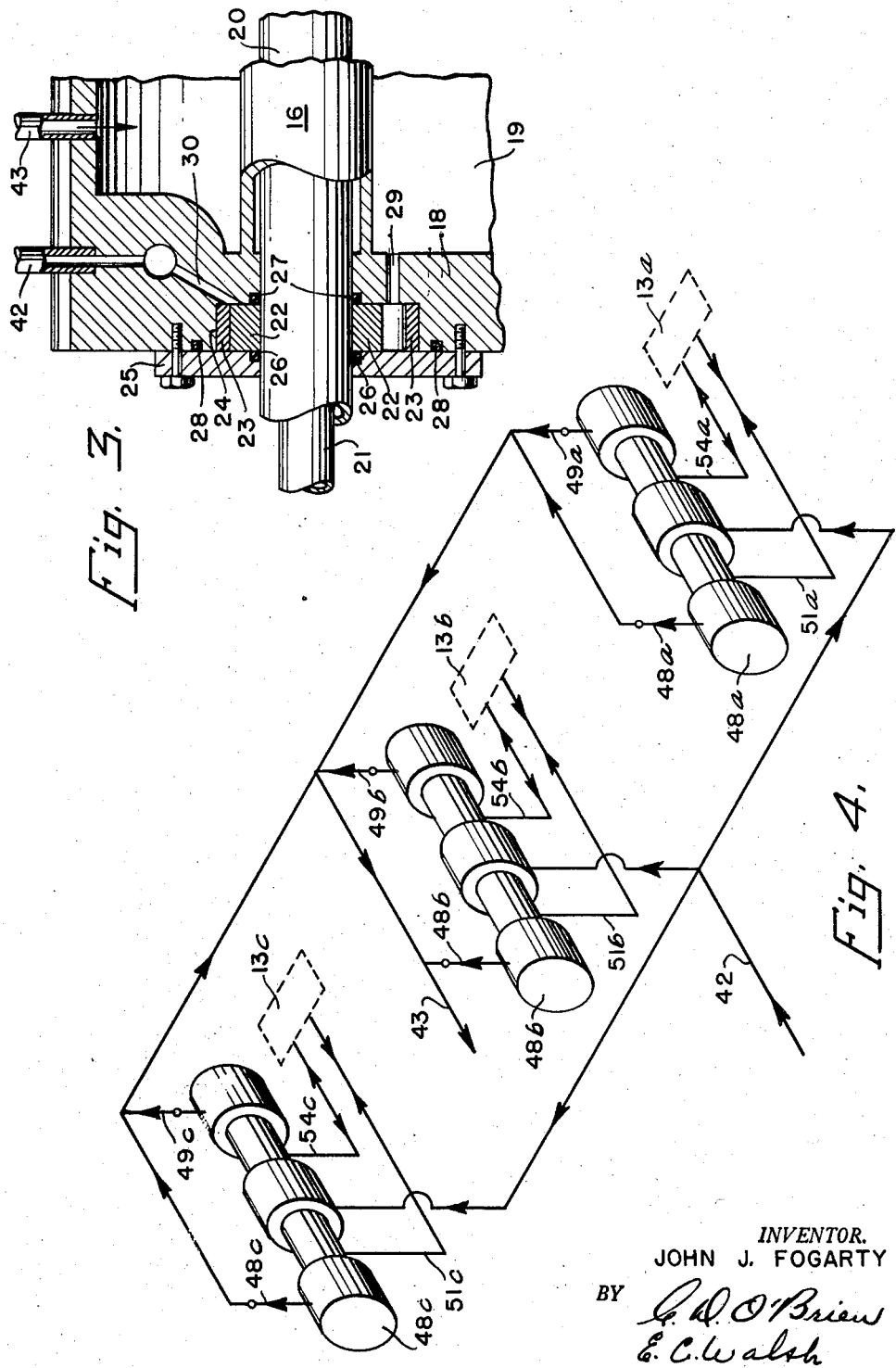

United States Patent Office 2,851,982
Patented Sept. 16, 1958

2,851,982

HYDRAULIC SERVO ACTUATOR UNIT FOR TORPEDO RUDDERS

John J. Fogarty, Glendale, Calif., assignor to the United States of America as represented by the Secretary of the Navy Application January 18, 1954, Serial No. 404,815

12 Claims. (Cl. 114—23)

(Granted under Title 35, U. S. Code (1952), sec. 266)

The invention described herein may be manufactured and used by or for the Government of the United States of America for governmental purposes without the payment of any royalties thereon or therefor.

This invention relates to torpedoes and more particularly to steering apparatus for same.

The principal object of the invention is to provide a unitary hydraulic servo actuator unit for the steering rudders of a torpedo.

Another object is to provide a unit of the foregoing type which is relatively compact and which minimizes kinematic connections between the rudders and their actuators.

Another object is to provide improvements in torpedo triaxial rudder control actuator mechanisms.

Another object is to operate the rudder actuators by power derived from a propeller shaft of a torpedo.

Further objects, advantages, and salient features will become more apparent from the description to follow, the appended claims and the accompanying drawing, in which:

Fig. 3 is an enlarged section taken on line 3—3, Fig. 2; and

Fig. 4 is a diagrammatic illustration of a manifold system.

Figure 1:
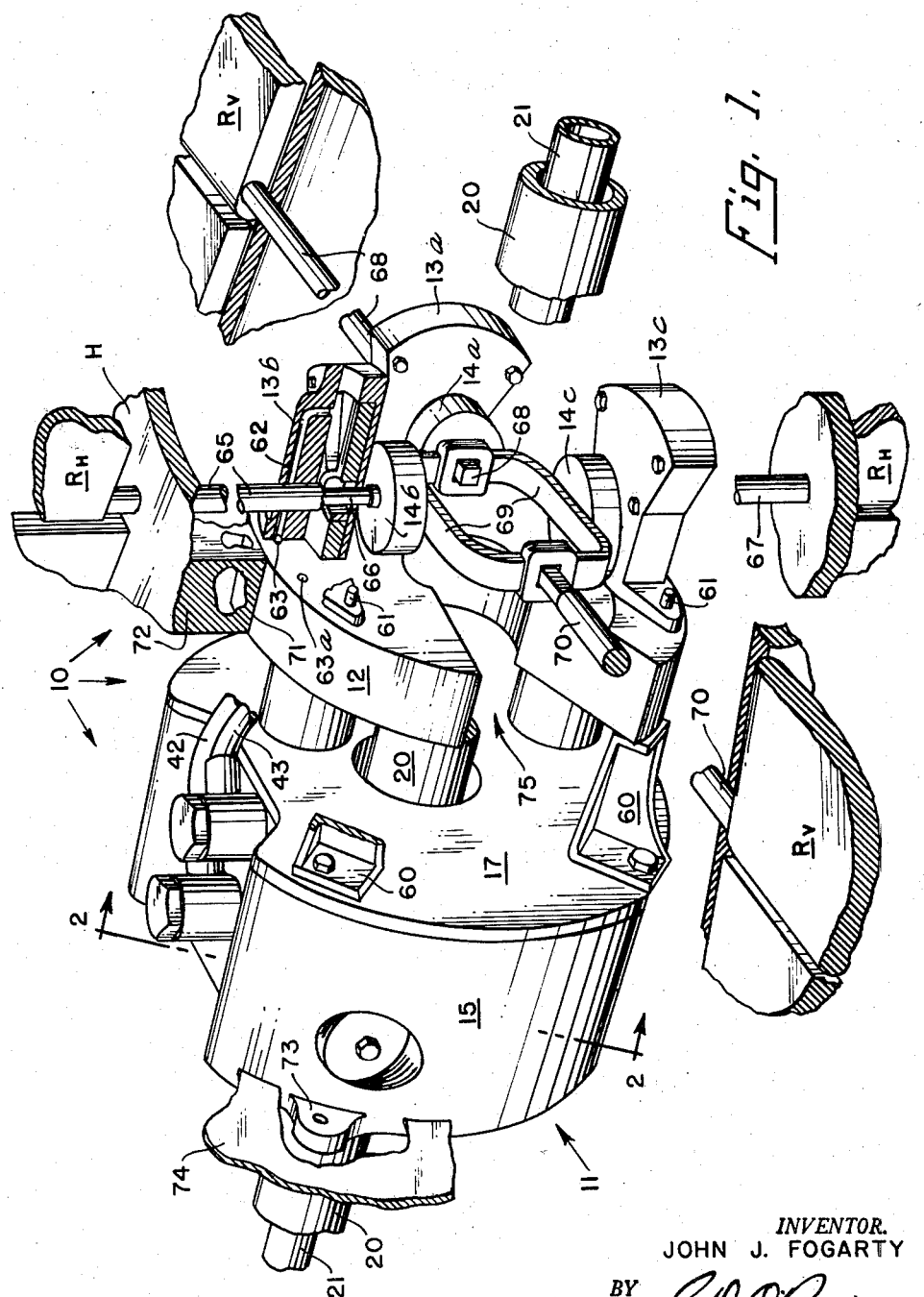
Fig. 1 is a fragmentary broken away perspective of a portion of the tail cone of a torpedo with the subject of the invention disposed therein.

Referring in detail to the drawing, and particularly Fig. 1, the invention comprises, in general, a rudder actuator unit 10 having a fluid pressure source 11, a manifold 12 hydraulically connected thereto, rudder actuators 13a, 13b, 13c and electrical feed back potentiometers 14a, 14b, 14c associated with the respective actuators.

Pressure source 11 comprises a generally cylindrical casing 15 having a central tube 16 extending between its end walls 17, 18 forming a closed sump 19. The torpedo propeller propulsion shafts 20, 21 extend through the tube, and a toothed pump rotor 22 is affixed to shaft 20 for rotation therewith within end wall 18, the teeth of the rotor engaging internal teeth of a ring 23, the cylindrical periphery of which is rotatably disposed in a bore 24. A cover plate 25 is secured to end wall 18, and suitable seals such as O rings 26, 27, 28 prevent outward fluid leakage from the pump. The pump is the "Gerotor" type manufactured by the Gerotor May Corporation of Baltimore, Maryland. An inlet or supply conduit 29 communicates the suction side of the pump with sump 19, and a conduit 30 communicates its discharge side with an accumulator 31.

Figure 2:
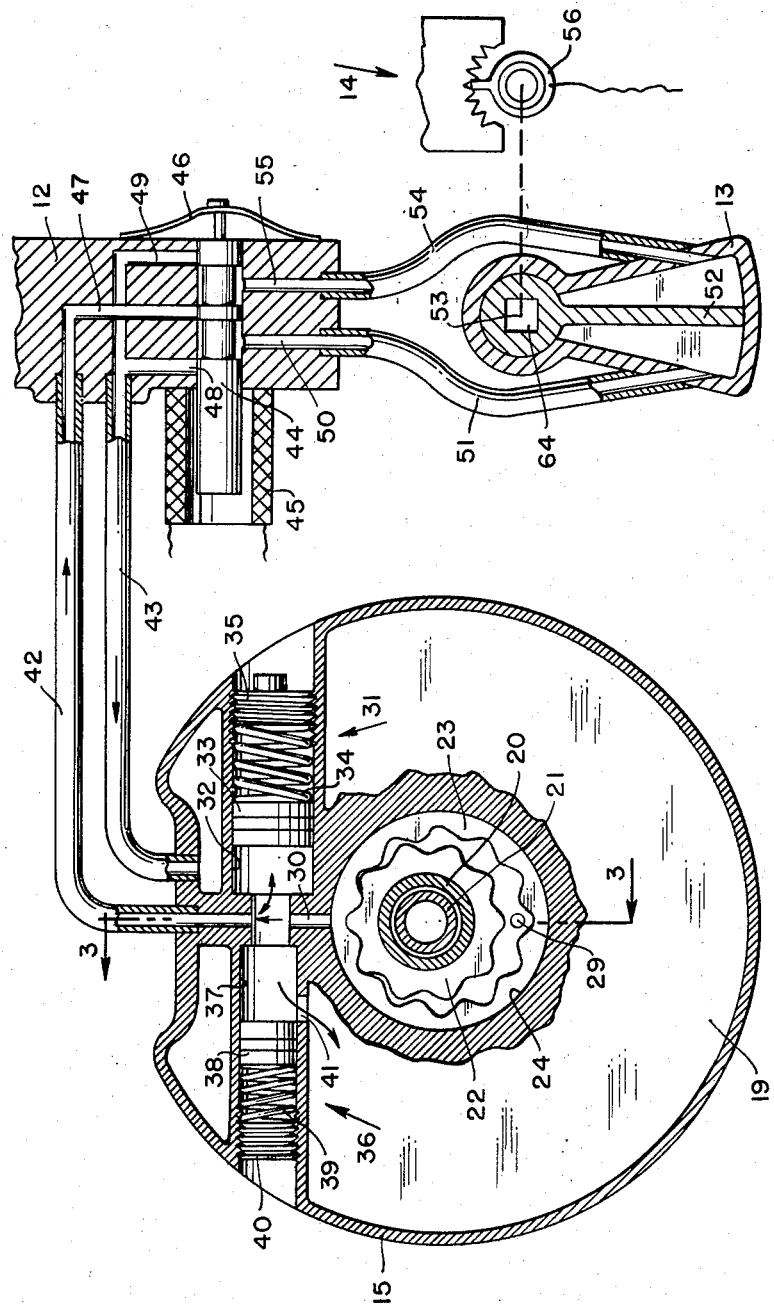
Fig. 2 is partly a section taken on line 2—2, Fig. 1, and partly a sectional diagrammatic illustration of a hydraulic system for one rudder.

Accumulator 31, best shown in Fig. 2, is provided with a bore 32 in which a piston 33 is slideably disposed, the piston being urged to the left by a compression spring 34, one end of which abuts the piston and the other end of which abuts an adjustable plug 35 which threadedly engages the casing. Conduit 30 also communicates with a pressure relief valve 36 comprising a bore 37 in which a piston 38 is slideably disposed, the piston being urged to the right by a compression spring 39, one end of which abuts the piston and the other end of which abuts an adjustable plug 40 which threadedly engages the casing. Piston 38, in the position shown, uncovers a bypass port 41 which communicates with the sump. When propeller shaft 20 is rotating, piston 33 is moved to the right against the urge of its spring to provide a hydraulic accumulator reservoir within bore 32, and piston 38 is moved to the left to uncover port 40 and return any excess fluid to the sump which is not required by the rudder actuators. The fluid supply apparatus so far described is hydraulically connected to manifold 12 by a supply conduit 42 and a return conduit 43, the former being connected to the accumulator and the latter to the sump.

The manifold carries three electrically operated valves of conventional type such as the "Nike" valve manufactured by the Bell Telephone Laboratories, or the "Bertea" valve manufactured by the Bertea Co. of Pasadena, California, such valves being illustrated in simplified form in Fig. 2 and comprising a piston type valve 44 operated in one direction by a solenoid 45 and in the other direction by a flat or flexure spring 46. In the position shown, the piston has cut off supply port 47 and return ports 48, 49 and no fluid flows through the manifold. Assuming that the piston is now moved to the right, fluid flows from port 47 to port 50 and conduit 51 to the left side of oscillatable vane 52 of actuator 13, rotating the vane counterclockwise about an axis of rotation 53. Port 49 is also uncovered and fluid trapped in the actuator at the right side of the vane flows through conduit 54, to port 55, port 49 and back to the sump through conduit 43. It will be apparent that when the valve moves to the left of the position shown, the fluid flow will be reversed from that just described and the vane will move clockwise. The movable finger 56 of a potentiometer 14 is connected directly to the vane for movement therewith and serves as a feed back to indicate the vane position.

Fig. 4 diagrammatically illustrates the manifolding to the three actuators 13a, 13b, 13c, these and the various ports and conduits being designated with the same reference numerals just described with subscripts. Referring to the lower right portion of the figure, fluid flows to actuator 13a through 54a as indicated by the arrow pointing toward actuator 13a. At the same time fluid flows away from actuator 13a through 51a, as indicated by the arrow pointing away from same. The other pair of arrows on 54a, 51a indicate reversed flow from that just described. The arrow on 48a indicates flow when there is no flow in 49a, as indicated by the circle in the latter, and when there is flow through 49a, as indicated by the arrow thereon, there is no flow through 48a, as indicated by the circle thereon. The same nomenclature is employed for the other valves and actuators supplied thereby. The various conduits which hydraulically connect the actuators with the supply and discharge conduits 42, 43 may be drilled, cored or otherwise formed in the manifold in any manner which will be apparent to those skilled in the art.

Referring to Fig. 1, manifold 12 is rigidly connected to pressure source 11 by a plurality of angularly spaced brackets 60, opposite ends of which are bolted to the pressure source and manifold. Each actuator is secured to the manifold by bolts 61 and provided with a pair of cored passageways, such as passageways 62, to each side of the vane, the outer ends of these passageways communicating with apertures, such as 63, 63a which communicate with the control valve for the actuator by conduits such as 50, 55. Each actuator vane, as best shown in Fig. 2, is provided with a splined opening 64 which receives a corresponding shaped end of a rudder shaft. As shown in Fig. 1, upper rudder shaft 65 extends through a suitable aperture in torpedo hull H, its inner end engaging the vane of upper actuator 13b, as just described. A splined shaft 66 which is connected to and rotates a finger 56 in potentiometer 14b engages a corresponding socket in shaft 65, so that shaft 65, the actuator vane and potentiometer finger all rotate in unison. Identical connections are provided between lower rudder shaft 67 and its associated actuator 13c and potentiometer 14c. Since separate actuators are employed for shafts 65, 67, it will be apparent that the respective horizontal direction rudders $R_h$ attached thereto may be moved together or independently, the former movement providing steering in azimuth and the latter correcting roll about the torpedo axis. Vertical rudders or elevators $R_v$ are operated by a single actuator 13a, the inner splined end of shaft 68 being connected to the actuator vane as described for the other actuators and extending through potentiometer 14a into a splined aperture in one side of yoke 69. Rudder shaft 70 extends into a similar aperture in the other side of the yoke. It will be apparent that these rudders are always constrained to move together, in contradistinction to the horizontal rudders which may move together or differentially.

When the unit is installed in a torpedo it is inserted into the forward end of the torpedo tail cone, manifold 12 telescoping and centering the unit within a cylindrical bore 71 in a bulkhead 72. When so centered, angularly spaced lugs 73 engage the front face of bulkhead 74 and are secured thereto by bolts thus positioning the unit longitudinally within the torpedo, whereby the rudder shafts are in alignment with their respective actuators. The splined apertures in the vanes of the various actuators are now in alignment with their respective rudder shafts, the latter being moved inwardly to their operative positions. A suitable electric harness (not shown) is carried by the unit and contains the various electrical conductors for the potentiometers and actuator solenoids. The forward terminal ends of these conductors are connected to the guidance control of the torpedo in any suitable manner, such as by a multiple jack and plug connector. Since the illustration of the various conductors would render the drawing confusing, they have been omitted in the interest of clarity.

The cutout 75 in manifold 12 provides a passageway for an engine exhaust pipe (not shown) and may be omitted in torpedoes of types which do not require an exhaust pipe extending through the tail cone in the particuar location of the cutout.

It will now be apparent that the invention provides a torpedo rudder actuator unit with the attendant advantages of the objects of the invention and which may be assembled and completely bench tested prior to its installation in a torpedo. Also, if for any reason it becomes necessary to remove the unit from a torpedo when it is in proper operating order it may be reinstalled therein without recheck, and proper operation will be assured.

Obviously many modifications and variations of the present invention are possible in the light of the above teachings. It is therefore to be understood that within the scope of the appended claims the invention may be practiced otherwise than as specifically described.

I claim:

1. In a torpedo of the type having a pair of elevational rudders and a pair of azimuthal rudders disposed adjacent the outside of the tail section of the torpedo, each rudder having an oscillatable rudder shaft with an inner end thereof disposed within the tail section, and a rotatable propulsion shaft extending axially of the tail section, the improvements in combination comprising; a rudder actuator unit including a closed casing disposed in the tail section and through which the torpedo shaft extends, a rotary liquid pump carried by the casing drivingly connected to the propulsion shaft, the casing having a sump for supplying the pump with liquid, the pump having a pressure discharge conduit, a manifold affixed to the casing adapted to extend about the propulsion shaft, an oscillatable vane type actuator affixed to the manifold and operatively connected to the inner ends of the elevational rudder shafts for conjointly rotating same, a pair of similar actuators affixed to the manifold, each being operatively connected to an azimuthal rudder shaft for rotating same, an electrically operated valve for each actuator carried by the manifold for controlling flow of liquid to and from its associated actuator, conduit means connecting all of the valves with the pump discharge, and conduit means connecting all of the valves with the sump.

2. Apparatus in accordance with claim 1 including a hydraulic accumulator in the casing and communicating with the pump discharge.

3. Apparatus in accordance with claim 1 wherein the manifold is provided with a circular periphery adapted to telescope into a corresponding bore in the tail section, the casing being provided with means for securing same to a bulkhead or like in the tail section.

4. Apparatus in accordance with claim 1 wherein the vane of each actuator is directly connected to a feed back potentiometer carried by the actuator.

5. In a torpedo of the type having a rotary propulsion shaft extending axially thereof, the improvements in combination comprising; a pumping unit for the rudder actuators of the torpedo comprising a closed casing having an aperture extending between opposite ends thereof through which the propulsion shaft extends, a rotary pump carried by the casing and drivingly connected to the shaft, a sump within the casing adapted to receive liquid returned from the actuators, an accumulator carried by the casing adapted to store liquid under pressure discharged by the pump, for delivery to the actuators upon demand.

6. Apparatus in accordance with claim 5 wherein said pump comprises a peripherally toothed rotor directly connected to the propulsion shaft for concentric rotation therewith, and an internal toothed ring meshing with the teeth of the rotor, the ring being rotatable about an axis parallel to the axis of rotation of the rotor and propulsion shaft.

7. In a torpedo of the type having a pair of elevational rudders and a pair of azimuthal rudders disposed adjacent the outside of the tail section of the torpedo, each rudder having an oscillatable rudder shaft with an inner end thereof disposed within the tail section, and a rotatable propulsion shaft extending axially of the tail section, the improvements in combination comprising; a manifold extending about said shaft having a circular periphery telescopically disposed within a corresponding bore in the tail section, the manifold having a rear face disposed forwardly of the rudder shafts, an oscillatable vane type actuator affixed to the rear face of the manifold and operatively connected to the inner ends of the elevational rudder shafts for rotating same, a pair of similar actuators affixed to the rear face of the manifold, each being operatively connected to an inner end of an azimuthal rudder, an electrically operated valve for each actuator carried by the manifold for controlling flow of liquid to and from its associated actuator, a conduit communicating all of the valves with a source of liquid under pressure, and a conduit communicating all of the valves with a recirculated supply of liquid for subsequent delivery to said source.

8. Apparatus in accordance with claim 7 wherein said source comprises a pumping unit affixed to the tail section and to the manifold, maintaining the latter in a predetermined position longitudinally of the tail section with the actuators in alignment with the inner ends of the rudder shafts.

9. In a torpedo having a pair of elevational rudders and a pair of azimuthal rudders disposed adjacent the outside of the tail section of a torpedo, each rudder having an oscillatable rudder shaft with an inner end thereof disposed within the tail section, and a rotatable propulsion shaft extending axially of the tail section, the improvements in combination comprising; a rudder actuator unit bodily insertable into the tail cone from the front end thereof, and adapted to be affixed to the tail section in a predetermined position longitudinally thereof, said unit comprising vane actuators operatively connectible with the inner ends of rudder shafts when the unit is in said predetermined position, valve means carried by the unit for supplying fluid to the actuators, and a pumping unit for supplying and receiving liquid from the valve means, the unit being constructed to permit the propulsion shaft to extend axially therethrough.

10. A torpedo comprising; a pair of conjointly swingable elevational rudders, a vane type hydraulic actuator for swinging the elevational rudders to control only the elevational direction of the torpedo, a pair of independently swingable azimuthal rudders, a vane type hydraulic actuator for each azimuthal rudder for swinging same, all of the actuators being disposed within the torpedo with the respective vanes thereof connected to directly apply torque to inner ends of swingable rudder shafts carried by the rudders.

11. Apparatus in accordance with claim 10 wherein said actuators are affixed to a common manifold disposed in a predetermined position in the torpedo, the manifold being constructed to supply liquid to all of the actuators.

12. In a torpedo of the type having a pair of elevational rudders and a pair of azimuthal rudders disposed adjacent the outside of the tail section of the torpedo, each rudder having an oscillatable rudder shaft with an inner end thereof disposed within the tail section, and a rotatable propulsion shaft extending axially of the tail section, the improvements in combination comprising; a hydraulic recirculatory rudder actuator unit including a closed casing disposed within the tail section and through which the propulsion shaft extends, said unit including a liquid sump and an accumulator adapted to contain liquid under pressure, a rotary liquid pump carried by the casing and drivingly connected to the propulsion shaft communicating with the sump adapted to supply liquid under pressure to the accumulator, oscillatable vane type actuators affixed to the unit in angularly spaced relationship around the propulsion shaft and connected to inner ends of the rudder shafts, and valve means carried by the unit for operating the actuators to thereby swing the rudders, said valve means communicating with the accumulator and sump.

References Cited in the file of this patent

UNITED STATES PATENTS

| | | |
|---|---|---|
| 1,659,653 | Hammond | Feb. 21, 1928 |
| 1,855,349 | Hammond | Apr. 26, 1932 |
| 1,973,545 | Sperry | Sept. 11, 1934 |
| 2,364,128 | Carlson | Dec. 5, 1944 |
| 2,366,925 | May | Jan. 9, 1945 |
| 2,398,421 | Frische et al. | Apr. 16, 1946 |
| 2,401,168 | Kronenberger | May 28, 1946 |
| 2,664,151 | Viale | Dec. 29, 1953 |